Aug. 30, 1960    A. B. GRAHAM    2,950,817
MANUFACTURE OF TURBINE ROTORS
Filed March 18, 1957    2 Sheets-Sheet 2
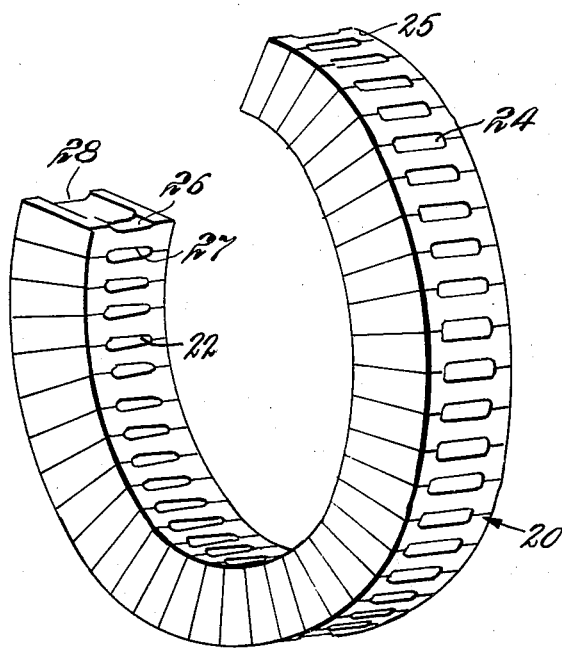
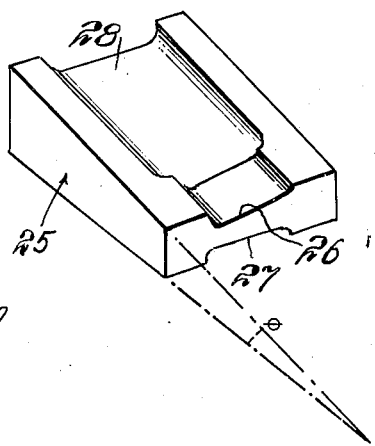
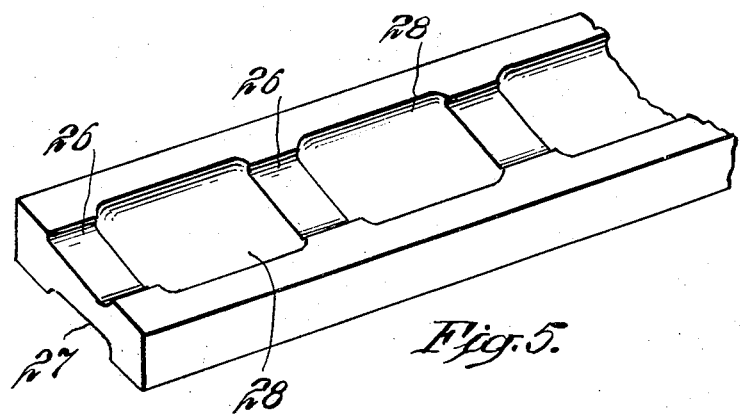
INVENTOR.
ALEXANDER BARBOUR GRAHAM
BY
ATTORNEY

United States Patent Office 2,950,817
Patented Aug. 30, 1960

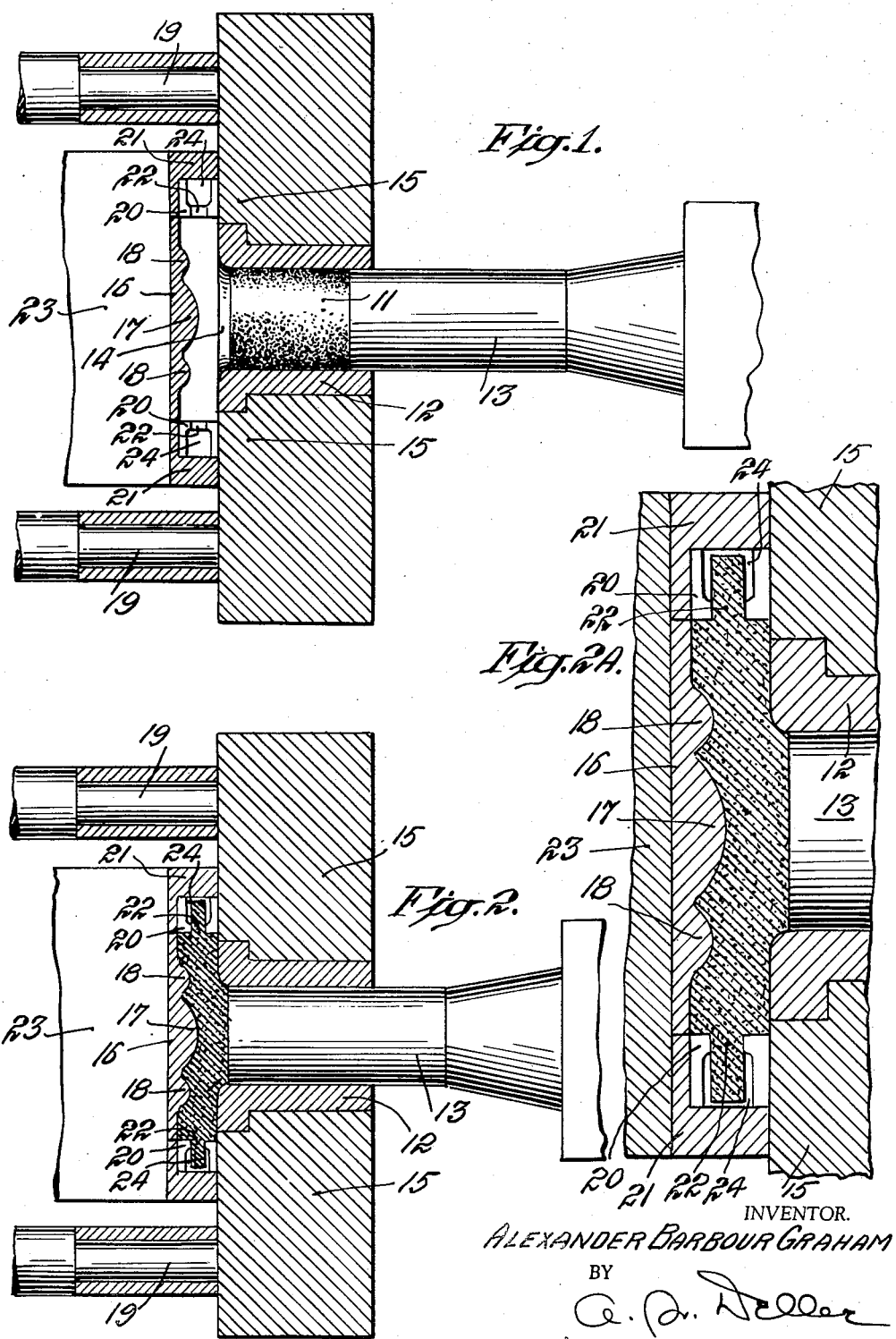

2,950,817

MANUFACTURE OF TURBINE ROTORS

Alexander B. Graham, Whitecraigs, Glasgow, Scotland, assignor to The International Nickel Company, Inc., New York, N.Y., a corporation of Delaware Filed Mar. 18, 1957, Ser. No. 646,741

Claims priority, application Great Britain Mar. 28, 1956

1 Claim. (Cl. 207—17)

The present invention relates to the manufacture of a turbine rotor and, more particularly, to the manufacture of a turbine rotor having extruded blades integral therewith.

A turbine rotor comprises a disc having geometrically complex blades attached to its circumferential periphery. It is well known that the manufacture of blades is complicated and expensive. Considerable economy could be effected if the bodies and blades of rotors for small gas turbines, such as can be used in motor cars, pumps and so forth, were made integral with one another from a single metal blank. It has been proposed to hot forge a steel blank which is initially smaller in diameter than the root diameter of the blades of the finished rotor between dies which are arranged to squeeze the blank axially and force the metal of the peripheral zone radially outwards into portions of the die which form a zig-zag outer portion which can be subject to further processing to eliminate some portions and to form the blades. In this process, the die parts, between which is forced the metal to be formed into the zig-zag portion, are approaching one another axially during the process; and although the object is to make the rotor by a single forging blow, it may be necessary to complete the forging by applying a second blow after reheating. In addition, since a practical forging die cannot be undercut, the structures which can be produced by forging are limited by the design considerations of the die. The forged product requires cutting away metal in order to actually begin to form a blade structure. In other words, because of the particular location of the blades and the limitations imposed by the die design the best that can be accomplished by forging is a rough blanking operation.

Although attempts were made to overcome the foregoing difficulties and other disadvantages, none, as far as I am aware, was entirely successful when carried into practice commercially on an industrial scale.

It has now been discovered that a turbine rotor having integral extruded blades may be produced by a hot working process in a novel apparatus.

The invention contemplates providing an apparatus which may be used to produce a turbine rotor having extruded blades integral therewith.

Another object of the invention is to provide a novel die chamber which may be used to produce a turbine rotor having extruded blades integral therewith.

It is also an object of the present invention to provide a process by means of which a turbine rotor having integral extruded blades or other articles having radially extending blades may be formed in a single operation.

Other objects and advantages will become apparent from the following description taken in conjunction with the accompanying drawing, in which:

Figure 1 is a sectional view of an extrusion apparatus with a billet in the container thereof just prior to the application of pressure;

Fig. 2 depicts a sectional view of the same extrusion apparatus after pressure has been applied to the billet;

Fig. 2a is an enlarged sectional view of the die chamber portion of the apparatus at the stage of the process depicted in Fig. 2;

Fig. 3 shows an external view of a die element or segment;

Fig. 4 illustrates a die ring formed from a plurality of die elements or segments depicted in Fig. 3 and is cut away to show the blade-forming orifices in the ring; and Fig. 5 is an external view of an extruded section from which die elements or segments may be manufactured.

Generally speaking, the present invention contemplates a die chamber which comprises a die having opposed surfaces maintained a fixed distance apart from one another by a peripherally located segmented orifice-containing ring comprising a plurality of mating, uniformly tapered segments defining orifices of fixed shape at the mating lines. Solid heat resistant metal is introduced into the die through an opening in at least one of the opposed surfaces and is forced by means of axial pressure to flow radially between the opposed surfaces through the peripheral orifices. The orifices shape the metal into blades and preferably there is free space beyond each orifice into which the blades can pass freely. The metal is encouraged to flow through the peripheral orifices by a centrally located, integral metal guide means on the surface opposite the one through which metal enters the die chamber.

In manufacturing turbine rotors having extruded blades integral therewith, the orifices in the ring on the circumferential periphery of the die chamber are profiled to produce an airfoil section shape. Each blade-producing orifice is formed by the mating of two similarly tapered die elements or segments. The elements or segments are tapered in such a manner that the planes of the tapered mating sides, if extended, would meet at a definite angle $\theta$ and form a straight line. The angle $\theta$ is defined by the formula $$\frac{360}{X} = \theta$$

wherein X is the number of segments and the aforementioned hypothetical line passes through at least one point on the axis of the completed segmented ring when the segments are in the proper assembled position. The mating surfaces preferably lie on the radii of the cylindrical surface defined by the inner faces of the segments. When the segments are properly mated, a complete ring is formed and airfoil section die orifices result at the lines of segmentation. Hot workable, heat resistant metal is formed by forcing it radially through these orifices by means of applied axial pressure. The formed metal is removed from the die by removing the opposed die chamber surfaces and forcing the segments of the ring in a radial direction. In this manner, the segments may be removed from one another without locking after metal has been forced through the orifices. The product of the process is thereafter machined, etc., to final shape.

In practice, the centrally located, integral metal guide means mentioned hereinbefore may take the form of a mandrel-like, centrally-located integral dome. The metal guide means tends to minimize abrupt changes in section and encourages the formation of smooth flow lines in the metal. More desirable results are achieved when the domed central guide means or mandrel is augmented with a co-axial, concentric annular dome-like structure integral with the same abutment surface. This concentric dome-like structure lies between the central dome and the peripheral ring and preferably has approximately the same central diameter as the billet admitting opening in the opposed surface.

Preferably, the opposed axial surfaces (i.e., surfaces substantially perpendicular to the axis of applied pressure), of the die described hereinbefore are formed by two opposed plates spaced apart, one of which has a domed central portion and a co-axial concentric annular domed structure intermediate between the center and the periphery of said plate and the other has a central opening or billet admitting port through which the hot metal, in the form of a billet, is forced by a ram in the way common in extrusion processes. A turbine rotor commonly has a central hub, a web and an outer ring. The blades project radially from this ring. In the instant case, the aforementioned plates shape the web and ring. The plates are spaced apart from one another by a segmented ring of members in which the die orifices are formed. It is preferred to build up this segmented ring from a number of similar or substantially identical die members or segments arranged in pairs and each shaped on each of their tapered mating faces to form a part of an orifice. These members or segments may themselves be lengths of bars extruded to approximately the cross section desired at the inner or orifice end, each length cut from such a bar being then forged or machined to the tapering shape required to enable a ring to be formed when the forged lengths are assembled and to provide a space of greater cross section than the orifice into which each extruded blade may emerge. The segments are so formed that when assembled together in said annular ring, a plurality of die orifices result. Each segment is hollowed or profiled on the mating faces to provide a portion of the orifice die wall. Preferably, both mating faces are hollowed or profiled so that the assembled ring has the same number of orifices as segments. The segments are tapered on the mating faces so that they may be removed from the formed turbine rotor by forcing them in a radial direction. Of course, the segments should be designed so that the line of segmentation will be across that portion of the extruded blade which will permit removal of the segments without locking, e.g., across a straight line connecting the leading and trailing edges of the extruded blades. A solid ring which is externally co-extensive with the aforementioned segmented annular ring retains the segments in position when pressure is applied in a radial direction during the forming process. Of course, this retaining ring must be removable in order that the segments may be removed from the formed metal in the manner described hereinbefore.

In carrying the invention into practice, it is preferred to produce a turbine rotor having a central hub, a web, an outer ring and blades projecting radially from said ring in an extrusion apparatus. Such an extrusion apparatus is depicted in the drawing. Referring thereto, a hot billet 11, preferably of hot workable, heat resistant metal is placed in position in an extrusion container 12, where it may be subjected to axial pressure by ram 13. In order to expedite the hot-working process, a lubricant 14 may be provided. Billet 11 is forced through the central opening with rounded corners in outer abutment plate 15 against domed inner abutment plate 16 having central dome 17 and the concentric co-axial dome-like annular structure 18 and is caused to flow radially so as to be shaped by said domed inner abutment plate 16 and said outer abutment plate 15, thereby forming the hub, web and outer ring of the turbine rotor. Outer abutment plate 15 is firmly set against and retained by stops 19. The die cavity defined by domed inner abutment plate 16 and outer abutment plate 15 is circumferentially bounded by segmented annular ring 20. Stops 19 are set in such fashion that when outer abutment plate 15 is in position thereon, segmented annular ring 20 is firmly held between inner abutment plate 16 and outer abutment plate 15 and is retained by outer retaining ring 21 which is concentric to and externally co-extensive with segmented annular ring 20. Die orifices 22, which form blades, are provided in said segmented annular ring at the lines of segmentation or mating. Inner abutment plate 16 is supported by a massive structure 23, which is relatively immovable and capable of resisting the full force of ram 13. The axis of annular segmented ring 20 preferably should substantially coincide with the axis along which pressure is applied to the billet. The same extrusion apparatus is depicted in Fig. 2 and again enlarged in Fig. 2a. In these figures, the hot workable, heat resistant alloy billet 11 has been deformed so that the metal has been extruded through peripheral die orifices 22 into the free space 24 beyond said orifices. Provision of free space 24 beyond orifices 22 is a preferred aspect of the present invention. As shown in Figs. 2 and 2a, the extrusion is halted prior to the time when the extruded product would hit the inner surface of the outer retaining ring 21. When the extrusion is complete, the outer abutment plate is removed from stops 19, the formed product is removed from the extrusion device and the segmented annular ring is parted from the formed product.

Fig. 3 depicts a preferred embodiment of segment 25. A plurality of these segments are used to form segmented ring 20 which is shown in Fig. 4. Surface 26 of segment 25 forms a portion of a die orifice wall. Surface 27 preferably forms the mating portion of a die orifice wall. Accordingly, when a plurality of segments 25 are assembled in such fashion that surface 26 of one segment is adjacent to surface 27 of another segment, the completed die orifices are formed. It is to be noted that preferably the outer portion 28 of segment 25 is cut away so that there will be free space beyond die orifice 22. The segments may themselves be produced from extruded lengths of bars. Fig. 5 illustrates such an extruded product having surfaces 26 and 27 formed by an extrusion die. This product may be sectioned and forged between dies to produce tapered segment 25, such as shown in Fig. 3. It is to be observed, however, that if desired the segments may be additionally tapered and angled. For example, the assembled ring may have the form of a conical frustum annulus.

The outer abutment plate with the central opening may be a facing on an extrusion container in which the axial pressure means, i.e., the ram, works, or may, as illustrated in the drawing, be thick enough to form such a container. In either case, the heated billet may be put in the container initially and enter the central space within the circumferential die orifices only when the axial pressure is provided. The opening which permits entrance of the billet should have rounded corners in order to minimize sharp transitions in section and to assist smooth flow of the metal into the die chamber. The inner abutment plate may be a fixed abutment or may have a central opening through which a second ram works so that the axial pressure is provided from two opposite directions simultaneously. Instead of a second ram, the inner abutment plate may be provided with an ejector plug which can assist in removal of the formed rotor. In the event a second ram is used, the central dome is formed on the face of the second ram. Likewise, the central dome is provided on the face of the ejector plug. In all instances the central dome is an important feature of the inner abutment surface. The billet which is shaped according to the invention is to be distinguished from a roughly shaped blank in that its diameter is small in relation to that of the turbine rotor made from it.

With respect to the manufacture of turbine rotors integral with extruded blades by means of the novel extrusion process, it should be understood that the term "heat resistant metal" is used to include austenitic nickel-chromium alloys including nickel-chromium-iron, nickel-chromium-cobalt, cobalt-chromium and cobalt-chromium-iron alloys which contain a total of at least about 25% nickel plus chromium, cobalt plus chromium, or nickel plus chromium plus cobalt in addition to small amounts of aluminum, titanium, molybdenum, tungsten, niobium, tantalum, silicon, manganese, zirconium and boron which may optionally be present in the alloys. These alloys are adapted to be subjected in use to temperatures up to about 700° C. or above and accordingly must be hot worked at temperatures around 1200° C.

For the purpose of giving those skilled in the art a better understanding of the invention, the following illustrative example is given:

*Example*

A billet of nickel-chromium alloy which is sold under the trade name of "Nimonic 90" and which contains nickel, cobalt, chromium, aluminum, titanium and small amounts of deoxidants and impurities is heated to a temperature of about 1180° C. This billet which is a cylinder approximately five inches in diameter is extruded in the disclosed apparatus to form a rotor disk about 1.75 inches thick at the blades and nine inches in outer diameter. The rotor has twenty-five blades. The pressure required to produce this rotor is about 2000 tons.

The present invention is particularly applicable to the production of turbine rotors integral with blades, particularly where the blades have a uniform airfoil cross section.

It is to be noted that the words "extrusion" and "die" have been used hereinbefore in this specification and that both of these words are old in the art and are used somewhat loosely. Herein, by the term "extrusion," I am solely concerned with the modern form of metallurgical extrusion technique in which a block of metal is converted into another form by forcing it to flow under pressure through a die orifice of fixed shape which imparts to the flowing metal the requisite form of the product as it issues into free space behind the die orifice. By the term "die orifice" I herein mean an orifice in an extrusion die impressing its form on the metal passing through it.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claim.

I claim:

A combined extrusion and forging die assembly comprising an inner abutment plate having a centrally disposed dome-like projection, which latter is surrounded by a concentric annular dome-like projection; an outer abutment plate having a centrally disposed liner, the latter having a work-material admitting bore axially in line with the inner abutment projections, said bore being larger in size than that of said centrally disposed projection and less in size than that of the crest of said annular projection; an outer retaining ring surrounding said inner abutment plate and seating flush against said outer abutment plate, said ring having an annular die seating cavity extending in depth from said outer plate to the outer edge of said inner plate; a segmented annular die ring seated in said cavity and seating flush against said outer plate, said die ring being provided with a plurality of extrusion orifices of the desired configuration followed by appropriate work-clearance cavities, the latter and said orifices being mutually aligned and directed radially with respect to said inner and said outer plates; whereby metal under pressure flowing in through said bore will be dispersed in substantially equal amounts around and over said projections and be extruded to form a plurality of substantially equal extrusions of the desired form and shape which remain integral with the metal last exiting from said bore, the later metal being forged to its final shape by the surfaces of said plates and a coacting plunger; and whereby said plates may be readily separated one from the other, said inner plate and said retaining ring may be readily removed from said die ring together with the finished workpiece, and the latter may be readily disengaged from the separate segments of said die ring.

References Cited in the file of this patent

UNITED STATES PATENTS

| | | |
|---|---|---|
| 1,410,093 | Dallmeyer | Mar. 21, 1922 |
| 1,682,399 | Mitchell | Aug. 28, 1928 |
| 1,836,821 | Singer | Dec. 15, 1931 |
| 2,334,927 | Hoern | Nov. 23, 1943 |
| 2,389,876 | Sequin | Nov. 27, 1945 |
| 2,461,640 | Hallberg | Feb. 15, 1949 |
| 2,782,921 | Norman | Feb. 26, 1957 |

FOREIGN PATENTS

| | | |
|---|---|---|
| 151,026 | Great Britain | Sept. 1, 1920 |
| 166,625 | Great Britain | July 11, 1921 |
| 714,653 | Great Britain | Sept. 1, 1954 |
| 745,655 | Great Britain | Feb. 29, 1956 |
| 472,601 | Canada | Apr. 3, 1951 |